(12) United States Patent
Kramer et al.

(10) Patent No.: US 9,951,850 B2
(45) Date of Patent: Apr. 24, 2018

(54) DRIVE ASSEMBLY FOR AN ELECTRIC DRIVE

(71) Applicant: GKN Driveline International GmbH, Lohmar (DE)

(72) Inventors: Fred Kramer, Wachtberg (DE); Mark Schmidt, Königswinter (DE); Ralph Mertens, Kaarst (DE); Thomas Altenrath, Siegburg (DE); Jiri Marks, Hennef (DE); Theodor Gassmann, Siegburg (DE)

(73) Assignee: GKN Automotive Limited, Redditch, Worcestershire (GB)

( * ) Notice: Subject to any disclaimer, the term of this patent is extended or adjusted under 35 U.S.C. 154(b) by 0 days.

(21) Appl. No.: 15/301,458

(22) PCT Filed: Mar. 31, 2015

(86) PCT No.: PCT/EP2015/057078
§ 371 (c)(1),
(2) Date: Oct. 3, 2016

(87) PCT Pub. No.: WO2015/150407
PCT Pub. Date: Oct. 8, 2015

(65) Prior Publication Data
US 2017/0175863 A1    Jun. 22, 2017

Related U.S. Application Data

(63) Continuation of application No. PCT/EP2014/056861, filed on Apr. 4, 2014.

(51) Int. Cl.
*B60K 1/00* (2006.01)
*F16H 37/04* (2006.01)
(Continued)

(52) U.S. Cl.
CPC ............. *F16H 37/043* (2013.01); *B60K 1/00* (2013.01); *F16H 3/089* (2013.01);
(Continued)

(58) Field of Classification Search
CPC ........ F16H 37/043; F16H 3/089; F16H 48/08; F16H 57/0025; F16H 57/0426;
(Continued)

(56) References Cited

U.S. PATENT DOCUMENTS 2,470,208 A * 5/1949 Avila ...................... F16D 23/04
192/53.36
3,425,293 A * 2/1969 Krawczyk ........... F16H 61/0272
192/3.57
(Continued)

FOREIGN PATENT DOCUMENTS

DE    102005022926 B3    2/2007
DE    102007045368 A1    4/2009
(Continued)

OTHER PUBLICATIONS

International Search Report and Written Opinion for PCT/EP2015/057078 dated Aug. 28, 2015 (with English translation; 20 pages).

Primary Examiner — James A Shriver, II
Assistant Examiner — Brian L Cassidy
(74) Attorney, Agent, or Firm — Bejin Bieneman PLC (57) ABSTRACT

A drive assembly for a motor vehicle has a multi-step transmission and a differential drive. The multi-step transmission comprises a rotatingly drivable driveshaft and an intermediate shaft parallel to the driveshaft, and at least one first transmission stage and a second transmission stage for transmitting torque from the driveshaft to the intermediate shaft with different transmission ratios, as well as a shift unit, wherein the intermediate shaft comprises an output gear for transmitting torque to a differential carrier of the
(Continued)

differential drive, wherein a rotational axis of the differential carrier extends parallel to the intermediate shaft, wherein the output gear and the shift unit are arranged axially between the at least two transmission stages, and wherein the driveshaft comprises bores for supplying lubricant.

18 Claims, 5 Drawing Sheets

(51) Int. Cl.

| | |
|---|---|
| F16H 63/30 | (2006.01) |
| F16H 3/089 | (2006.01) |
| F16H 57/00 | (2012.01) |
| F16H 57/04 | (2010.01) |
| F16H 25/20 | (2006.01) |
| F16H 48/08 | (2006.01) |
| F16H 59/68 | (2006.01) |
| F16H 63/32 | (2006.01) |
| F16H 61/32 | (2006.01) |
| B60K 6/36 | (2007.10) |
| B60K 6/547 | (2007.10) |
| F16H 61/28 | (2006.01) |

(52) U.S. Cl.
CPC ......... *F16H 25/2015* (2013.01); *F16H 48/08* (2013.01); *F16H 57/0025* (2013.01); *F16H 57/043* (2013.01); *F16H 57/0426* (2013.01); *F16H 57/0471* (2013.01); *F16H 57/0478* (2013.01); *F16H 57/0494* (2013.01); *F16H 59/68* (2013.01); *F16H 61/32* (2013.01); *F16H 63/304* (2013.01); *F16H 63/32* (2013.01); *B60K 6/36* (2013.01); *B60K 6/547* (2013.01); *B60K 2001/001* (2013.01); *B60Y 2200/91* (2013.01); *B60Y 2200/92* (2013.01); *B60Y 2306/03* (2013.01); *B60Y 2400/70* (2013.01); *F16H 2059/6807* (2013.01); *F16H 2061/2884* (2013.01); *F16H 2063/3063* (2013.01); *F16H 2200/0021* (2013.01); *F16H 2200/0034* (2013.01); *Y10S 903/909* (2013.01); *Y10S 903/919* (2013.01)

(58) Field of Classification Search
CPC ............... F16H 57/043; F16H 57/0478; F16H 57/0494; F16H 59/68; F16H 63/304; F16H 63/32
USPC ...................................................... 180/65.7
See application file for complete search history.

(56) References Cited

U.S. PATENT DOCUMENTS

| | | | | |
|---|---|---|---|---|
| 3,465,609 A * | 9/1969 | Fisher | ..................... | F16H 3/089 74/360 |
| 4,189,041 A * | 2/1980 | Muller | ..................... | F16D 23/06 192/114 T |
| 4,270,647 A * | 6/1981 | Leber | ..................... | F16D 13/74 192/113.35 |
| 4,494,638 A | 1/1985 | Zenker | | |
| 4,570,503 A * | 2/1986 | Theobald | ................ | F16H 3/091 74/331 |
| 4,627,302 A * | 12/1986 | Laylock | .................. | F16H 3/091 74/359 |
| 4,726,246 A * | 2/1988 | Whalen | .................... | F16H 3/093 74/333 |
| 4,771,647 A * | 9/1988 | Stevens | ................... | F16H 3/093 74/331 |
| 4,846,009 A * | 7/1989 | Paluska, Jr. | ............ | F16H 3/091 74/331 |
| 4,864,881 A * | 9/1989 | Beeson | ................... | F16H 3/091 74/331 |
| 5,385,064 A * | 1/1995 | Reece | ..................... | F16H 3/089 74/331 |
| 5,526,912 A * | 6/1996 | Gassmann | ............ | B60K 17/20 180/249 |
| 5,556,343 A * | 9/1996 | Gassmann | ............ | B60K 17/20 192/85.02 |
| 5,667,036 A | 9/1997 | Mueller | | |
| 8,272,965 B2 * | 9/2012 | Ruehle | ................... | F16D 23/06 184/5 |
| 8,387,754 B2 * | 3/2013 | Konig | ..................... | F16D 23/04 184/6.12 |
| 2001/0027651 A1 * | 10/2001 | Hauser | ................. | B60K 17/105 60/487 |
| 2002/0078792 A1 * | 6/2002 | Kobayashi | ............ | B60K 17/02 74/665 T |
| 2004/0094343 A1 * | 5/2004 | Fukuda | ............... | F16H 57/0415 180/68.2 |
| 2008/0251324 A1 * | 10/2008 | Kuryu | ...................... | F16C 3/02 184/6.12 |
| 2008/0318726 A1 * | 12/2008 | Matsubara | ............ | B60K 6/365 477/3 |
| 2009/0029819 A1 * | 1/2009 | Tabata | ................... | B60K 6/445 475/5 |
| 2010/0200335 A1 * | 8/2010 | Konig | ..................... | F16D 23/04 184/6.12 |
| 2011/0312460 A1 * | 12/2011 | Nett | ....................... | B60K 6/442 475/5 |
| 2012/0021861 A1 * | 1/2012 | Sakai | ..................... | B60K 6/365 475/5 |
| 2013/0065729 A1 * | 3/2013 | Fitzgerald | ............. | B60L 3/0023 477/8 |
| 2014/0004987 A1 * | 1/2014 | Sato | ........................ | F16H 3/093 475/150 |
| 2015/0031488 A1 * | 1/2015 | Okuda | ................... | B60K 6/365 475/5 |
| 2015/0080134 A1 * | 3/2015 | Tage | .................... | F16H 57/0426 464/7 |
| 2015/0087464 A1 * | 3/2015 | Mellet | ................... | F16H 37/022 475/210 |
| 2015/0119190 A1 * | 4/2015 | Isomura | ................ | B60W 20/20 477/3 |
| 2016/0033028 A1 * | 2/2016 | Tage | ....................... | F16H 57/0423 475/160 |

FOREIGN PATENT DOCUMENTS

| | | |
|---|---|---|
| DE | 102012204717 A1 | 9/2013 |
| FR | 2946292 A3 | 12/2010 |
| FR | 2946293 A1 | 12/2010 |
| FR | 2976526 A1 | 12/2012 |
| WO | 2005098269 A2 | 10/2005 |
| WO | 2012087700 A1 | 6/2012 |
| WO | 2012088860 A1 | 7/2012 |

* cited by examiner

DRIVE ASSEMBLY FOR AN ELECTRIC DRIVE

CROSS-REFERENCE TO RELATED APPLICATIONS

This application is a national stage of, and claims priority to, Patent Cooperation Treaty Application No. PCT/EP2015/057078, filed on Mar. 31, 2015, which claims priority to Patent Cooperation Treaty Application No. PCT/EP2014/056861 filed on Apr. 4, 2014, each of which applications are hereby incorporated herein by reference in their entireties.

BACKGROUND

An electric drive can serve as the only drive for the motor vehicle or it can be provided in addition to an internal combustion engine. In such a case, the electric drive and the internal combustion engine can each drive the motor vehicle on its own or, superimposed on one another, they can drive the motor vehicle jointly. Such drive concepts are referred to as hybrid drives.

Normally, an electric drive comprises an electric motor and, downstream thereto, a reduction gear unit which translates a rotational movement from a fast speed to a slow speed. From the reduction gear unit, the torque is transmitted to the driveline of the motor vehicle. For this, a differential drive arranged in the torque flow downstream the reduction gear unit divides the introduced torque to two output shafts for driving the motor vehicle wheels. The two output shafts of the differential drive have a differential effect relative to each other, i.e. if one of the two output shafts rotates more quickly, the other output shaft rotates correspondingly more slowly, and vice versa.

From FR 2 946 292 A3 a driving unit is known with two electric motors, two primary driveshafts, two intermediate shafts, two reduction gear units, and one differential drive. Each of the two reduction gear units is drivingly connected to differential drive, so that both reduction gear units are able to transmit torque to the differential drive. Between each driveshaft and the associated intermediate shaft there are provided two switchable sets of gears with different reduction ratios. A synchronising device is provided between the gear sets.

DE 10 2012 204 717 A1 proposes an drive assembly with an electric motor for a motor vehicle with a first electric machine and a first driveshaft, a second electric machine with a second driveshaft and a transmission with a planetary gear set, a spur gear unit and an output. The spur gear unit comprises a first set of gear with a first transmission ratio, a second set of gears with a second transmission ratio, and a shift unit. The shift unit can be switched into a first position in which the first gear of the first set of gears is connected to the first driveshaft and into a second position in which the first gear of the second set of gears is connected to the first driveshaft.

From FR 2 946 292 A3 a drive assembly is known with an electric motor, a reduction gear unit with two parallel shafts and a differential drive. The reduction gear unit comprises two set of gears for transmitting torque between the two parallel shafts. There is provided a double clutch which is able to transmit a torque introduced by the electric motor optionally to the respective drive gear of one of the two sets of gears.

WO 2012/087700 A1 proposes an electric drive module with an electric motor, a planetary drive, a synchronising unit, a reduction gear unit and a differential assembly. The sun gear of the planetary drive and the drive gear of the synchronising unit are connected to one another via a hollow shaft. The hollow shaft comprises radial bores.

Electric drives of the mentioned type with multi-step transmissions with clutch shift unit require a major constructional effort for the clutches and actuators. A multi-step transmission with a synchronising unit requires high switching forces, thus involving high demands to be met by the actuator.

SUMMARY

The present disclosure relates to a drive assembly for a motor vehicle, more particularly for an electric drive, as well as to a motor vehicle having such a drive assembly. A drive assembly with a multi-step transmission and a differential drive for a motor vehicle is provided. The drive assembly has a compact design, allows high-seed gear changing, and has a long service life. A motor vehicle with such a drive assembly is included in the disclosure.

The drive assembly for a motor vehicle has a multi-step transmission and a differential drive, wherein the multi-step transmission comprises a rotatingly drivable driveshaft and an intermediate shaft extending parallel to the driveshaft and at least one first transmission stage with a first set of gears and a second transmission stage with a second set of gears for transmitting torque from the driveshaft to the intermediate shaft with different transmission ratios, wherein the intermediate shaft comprises an output gear for transmitting torque to the differential carrier of the differential drive, wherein a rotational axis of the differential carrier extends parallel to the intermediate shaft, and wherein the output gear is arranged axially between the at least two transmission stages.

More particularly, it is proposed that the first transmission stage comprises a first drive gear rotatably supported on the driveshaft and an intermediate gear connected to the intermediate shaft in a rotationally fixed manner and that the second transmission stage comprises a second drive gear rotatably supported on the driveshaft and a second intermediate gear connected to the intermediate shaft in a rotationally fixed manner. The first drive gear and the first intermediate gear can also be referred to as a first pair of gears and the second drive gear and the second intermediate gear can also be referred to as the second pair of gears. The drive assembly comprises a gear shift unit, which can be arranged coaxially relative to the driveshaft and axially between the at least two transmission stages and is configured for selectively transmitting torque via the first transmission stage or the second transmission stage.

The shift unit can comprise an input part which is connected to the driveshaft in a rotationally fixed manner, a first output part which is connected to the first input part in a rotationally fixed manner, a second output part which is connected to the second drive gear in a rotationally fixed manner, and a coupler configured to couple the input part optionally to the first output part or the second output part for transmitting torque.

The driveshaft can comprise a longitudinal bore as well as at least one transverse bore for supplying at least one seat portion for one of the first drive gear, the second drive gear and the input part with lubricant. Thus, at least one transverse bore for a seat portion of the first drive gear and/or at least one transverse bore for a seat portion of the second drive gear and/or at least one transverse bore for a seat portion of the input part can be provided. In accordance with the present disclosure a seat portion can be a portion or a region where an element of the driveshaft is positioned, respectively radially supported. This includes the possibility that the element is rotatably supported on the respective seat portion, as is the case with the first and second drive gear, or that the element is supported on the respective seat portion in a rotationally fixed manner, as is the case with the input part. A seat portion can also be referred to as supporting portion.

The drive assembly is particularly compact in an advantageous manner. Because of the mentioned design, the space available between the gear changing stages can be made use of very well. The driveshaft, the intermediate shaft and the rotational axis of the differential are arranged substantially parallel relative to one another, with the radial distance between said components being relatively small. Overall, the transmission unit consisting of the multi-step transmission and the differential drive has a particularly small width and length and thus also a low weight. At the same time, the components mounted and supported on the rapidly rotating driveshaft are well supplied with lubricant due to the bores, so that, in spite of the compact design, heat can easily be dissipated and, overall, the transmission assembly comprises a long service life.

The drive assembly can comprise an electric motor for driving the driveshaft. The unit including the electric motor, multi-step transmission and differential drive can also be referred to as an electric drive. The electric drive can be used as the only drive for a motor vehicle or as an additional driving source for a motor vehicle which comprises an internal combustion engine as the main driving source. The electric drive can be used for driving any driving axle, the front axle or rear axle.

A torque introduced by the electric drive is transmitted to the driveshaft, and from there, via one of at least two transmission stages, to the differential carrier of the differential drive. The driveshaft can be arranged coaxially to the motor shaft of the electric motor, but depending on the respective technical requirements, it can also be arranged parallel thereto. The transmission ratio between the motor shaft and the driveshaft is in an example one, i.e., the driveshaft rotates at the same speed as the motor shaft, wherein other transmission ratios are also possible.

Each of the at least two transmission stages comprises a drive gear rotatably supported on the driveshaft and an intermediate gear rotationally fixed to the intermediate shaft which, at least indirectly, engage one another. A first set of gears with a first drive gear and a first intermediate gear comprises a first transmission ratio i1. A second set of gears with a second drive gear and a second intermediate gear comprises a second transmission ratio i2 which deviates from the first transmission ratio. In an example, the first transmission ratio which lies in particular between 3.0 and 4.0 is greater than the second transmission ratio which lies in particular between 1.3 and 2.3. In the first gear, the intermediate shaft consequently rotates slower than in the second gear. Only two transmission stages are mentioned above, but it is to be understood that, depending on the technical requirements regarding the electric drive, the multi-step transmission can also comprise more than two transmission stages.

The arrangement of gears on the driveshaft constitutes a special technical challenge, as said driveshaft, more particularly when driven directly by the electric motor, rotates at very high speeds of over 10,000 revolutions per minute. In order to achieve an adequate supply of lubricant and a long service life of the rotating components, the driveshaft can comprise a longitudinal bore and at least one transverse bore. In this way, the lubricant can flow from the inside of the driveshaft to the respective seat portion of the input part, the first output part and/or the second output part. The input part is connected to the driveshaft in a rotationally fixed manner with an interference fit, also referred to as a press fit, wherein at least one of the transverse bores is in a fluid connection with the input part. In this way, the formation of fit rust in the contact region between the driveshaft and the input part is prevented.

In particular it can be proposed that the input part is rotationally fixedly connected to the driveshaft with an interference fit, wherein, of the at least one transverse bores, at least one central bore is fluidically connected to the seat portion of the input part. As an alternative or in addition, of the at least one transverse bore, at least one first transverse bore can be fluidically connected to the seat portion of the first drive gear and/or at least one second transverse bore can be fluidically connected to the seat portion of the second drive gear. The first drive gear is rotatably supported on the driveshaft by means of a first bearing, wherein the first drive gear can comprise a first sleeve projection which extends axially towards the input part and is axially supported against same at least indirectly. Laterally adjacent to the first bearing, a first annular gap can be provided between the first sleeve projection and the driveshaft, though which gap lubricant can flow from the seat portion of the first drive gear to the gear shift unit. Alternatively or in addition, the same can apply for the second drive gear, i.e., a second annular gap can be provided through which lubricant can flow from the seat portion of the second drive gear to the shift unit.

According to an example, the first drive gear can be axially supported towards the input part against a first inner disc and away from the input part against a first outer disc. Accordingly, the second drive gear can be axially supported towards the input part against a second inner disc and away from the input part against a second outer disc. The terms "inner disc" and "outer disc" in this context refer to a central plane of the shift unit. The discs are provided in the form of sliding discs made of a low-friction material, thus allowing a low-friction sliding contact with the respective drive gear rotating relative thereto.

The first inner disc and/or the second inner disc can each comprise at least one groove through which lubricant can flow from the first and/or second annular disc to the shift unit. The first outer disc and/or the second outer disc can comprise a continuous contact face against which the respective drive gear is axially supported, i.e., the first outer disc and/or the second outer disc, more particularly, can be designed so as to be groove-less. This design with lubricating grooves in the inner discs and groove-less outer discs, the lubricant flowing through the transverse bores of the driveshaft to the bearing seats of the drive gears reaches the shift unit in a targeted manner for lubricating and cooling same.

According to an example, at one end of the driveshaft a supply assembly can be provided for supplying lubricant into the longitudinal bore. The supply assembly can comprise a supplying element with a tubular channel which extends into the longitudinal bore. A ring can be provided in the annular space formed between the tubular channel and the bore wall of the driveshaft. The ring, which for example can be pressed into the longitudinal bore, prevents any lubricant contained in the longitudinal bore from returning. Thus, the lubricant reaches specifically the transverse bores and from there flows to the bearing seats of the drive gears and to the seat faces of the input part, respectively.

The multi-step transmission, which can also be referred to as change-speed gearing, can comprise a gear shift unit for switching the at least two gear stages. The gear switch unit is arranged in particular coaxially relative to the driveshaft, which contributes to the transmission unit having a compact design. According to an example, the shift unit is arranged axially between the first drive gear and the second drive gear. The shift unit can partially radially overlap the first intermediate gear and/or the second intermediate gear, which leads to an efficient use of the available space. For a compact design it is advantageous if the shift unit at least partially has an axial overlap with the output gear of the intermediate shaft. Alternatively or in addition, the shift unit at least partially overlaps the central differential plane of the differential drive.

The central differential plane is a plane which extends perpendicularly to the differential axis and contains a differential gear axis. Overall, there is achieved an organic structure, wherein the shift unit, the output gear of the intermediate shaft, and the annular gear of the differential are arranged centrally or substantially in one plane and are laterally flanked by the gears of the first and of the second transmission stage.

According to an example, the gear shift unit comprises the following: an input part which is connected to the driveshaft in a rotationally fixed manner, a first output part which is connected to the first drive gear in a rotationally fixed manner, a second output part which is connected to the second drive gear in a rotationally fixed manner, and a coupler which can connect the input part optionally to the first output part or the second output part for of transmitting a torque. The coupler can be provided in the form of a sliding sleeve which is held on the input part in a rotationally fixed way and is axially displaceable relative thereto by means of an actuator. In its neutral position, the sliding sleeve is connected neither to the first nor to the second output part, so that the electric motor and the differential are uncoupled relative to one another. In a first shift position, the sliding sleeve is connected to the first output part, so that torque can be transmitted from the electric motor to the differential with a first transmission ratio. In a second shift position, the sliding sleeve is connected to the second output part in a rotationally fixed manner, so that torque can be transmitted via the second gear stage to the differential. It is understood that other types of switchable couplings can be used for selectively transmitting torque between the input part and one of the output parts, for example a claw coupling or a toothed coupling.

The actuator can comprise a spindle drive with a rotatingly drivable spindle and a spindle sleeve, which with an inner thread, engages a corresponding outer thread of the spindle, so that the spindle sleeve is axially moved if the spindle rotates, wherein a switch fork is fixed to the spindle sleeve which engages an annular groove of the sliding sleeve. The spindle can be driven by an electric motor which can be controlled by an electronic control unit. It is understood that other types of drive can also be used, for example a hydraulic drive. Also, instead of the spindle drive, other known actuators can be used for axially moving the sliding sleeve.

According to an example, a sensor is provided which is able to detect the axial position of the sliding sleeve and of the spindle sleeve respectively. Said signal is passed to the control unit for controlling the actuator.

To ensure especially accurate control conditions and for securely engaging the gears, it is advantageous to use further detecting means which can detect a signal representing the force needed for moving the sliding sleeve and the spindle sleeve respectively. Said signal is passed on to the control unit and is used for controlling the actuator.

According to an example, the shift unit, for an output part, comprises a synchronising mechanism. The synchronising mechanism is used to adjust the speeds between the input part and the respective output part in advance of the switching operation. The input part and the output part can be provided in the form of gearwheels and to that extent can also be referred to as input gear and output gear.

The output gear of the intermediate shaft, and thus also the annular gear of the differential carrier, are arranged axially between the first intermediate gear and the second intermediate gear. The output gear of the intermediate shaft has at least partially an axial overlap with the central differential plane. In this way a substantially symmetric construction with reference to the central differential plane is achieved. The output gear is firmly connected to the intermediate shaft and can be produced so as to be integral therewith. The seat faces for the two intermediate gears which are connected to the intermediate shaft in a rotationally fixed way, axially adjoin the output gear. The first intermediate gear is supported against a first side face and the second intermediate gear is axially supported against an opposed second side face of the output gear. It is proposed that the output gear comprises a smaller diameter and a greater width than the first intermediate gear and the second intermediate gear.

SUMMARY OF THE DRAWINGS

Examples will be described below with reference to the Figures below where.

DETAILED DESCRIPTION

Figure 1:
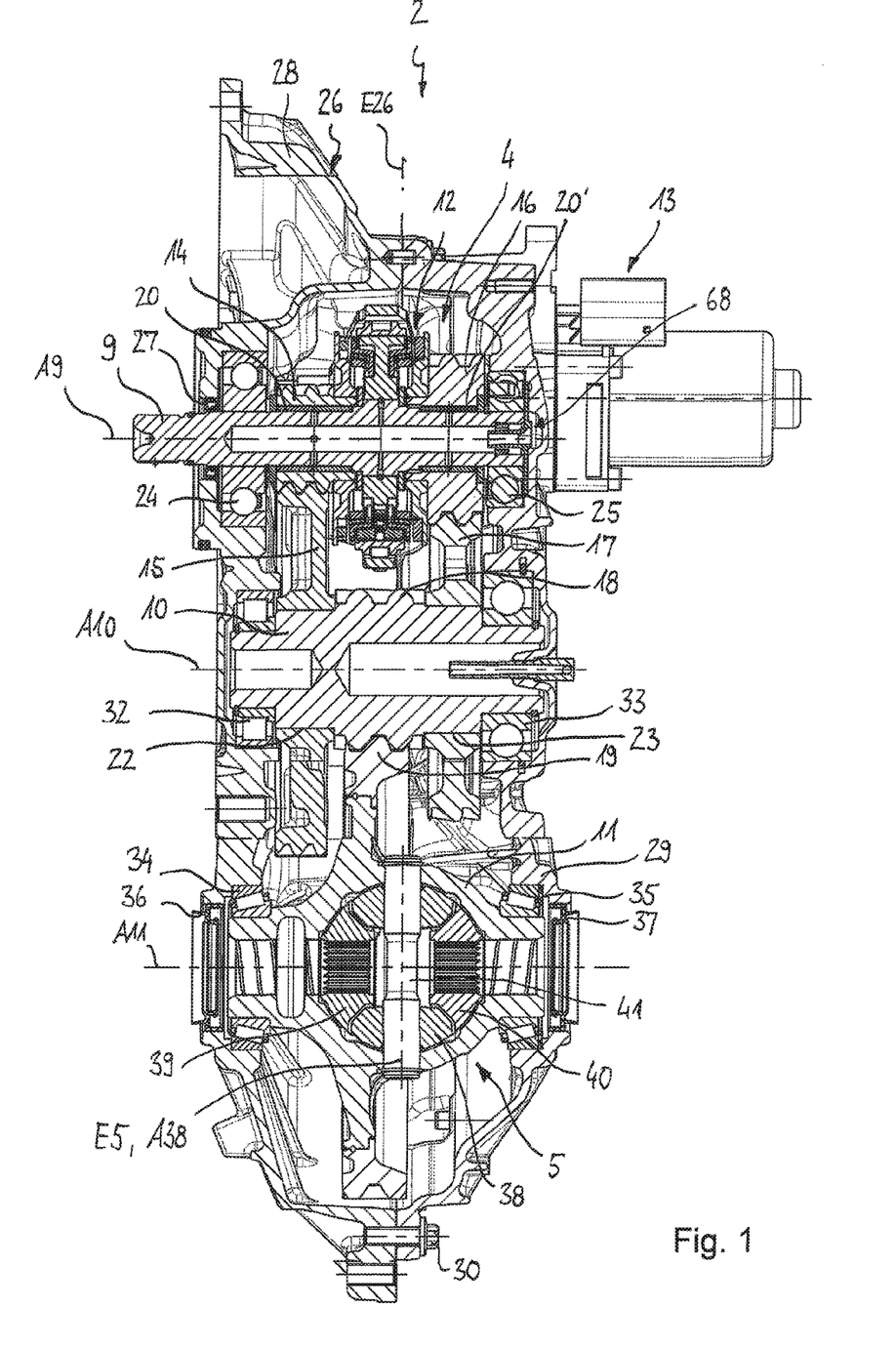
FIG. 1 shows an example drive assembly in a sectional illustration.
Figure 4:
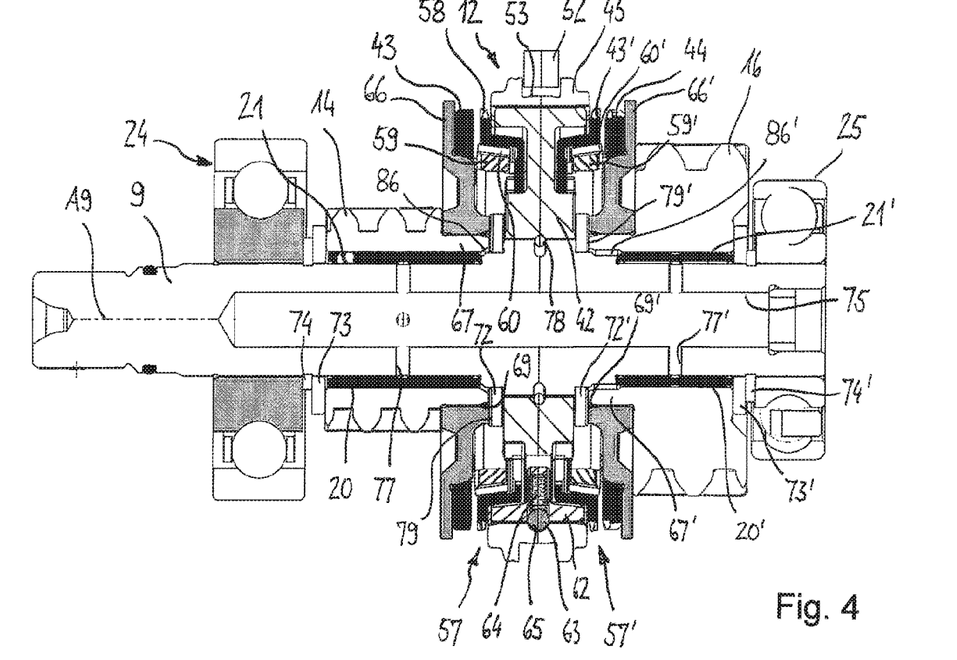
FIG. 4 shows the assembly consisting of the driveshaft and elements mounted thereon according to FIG. 1 as a detail.
Figure 5:
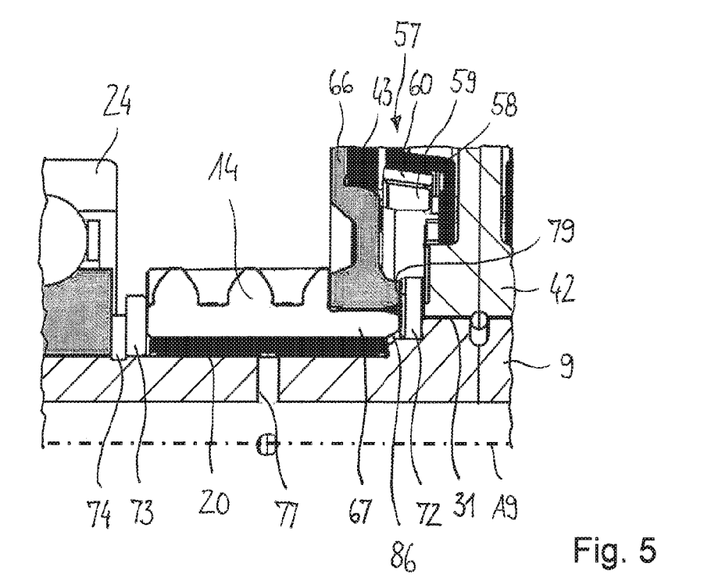
FIG. 5 shows a detail of the assembly according to FIG. 4.
Figure 6:
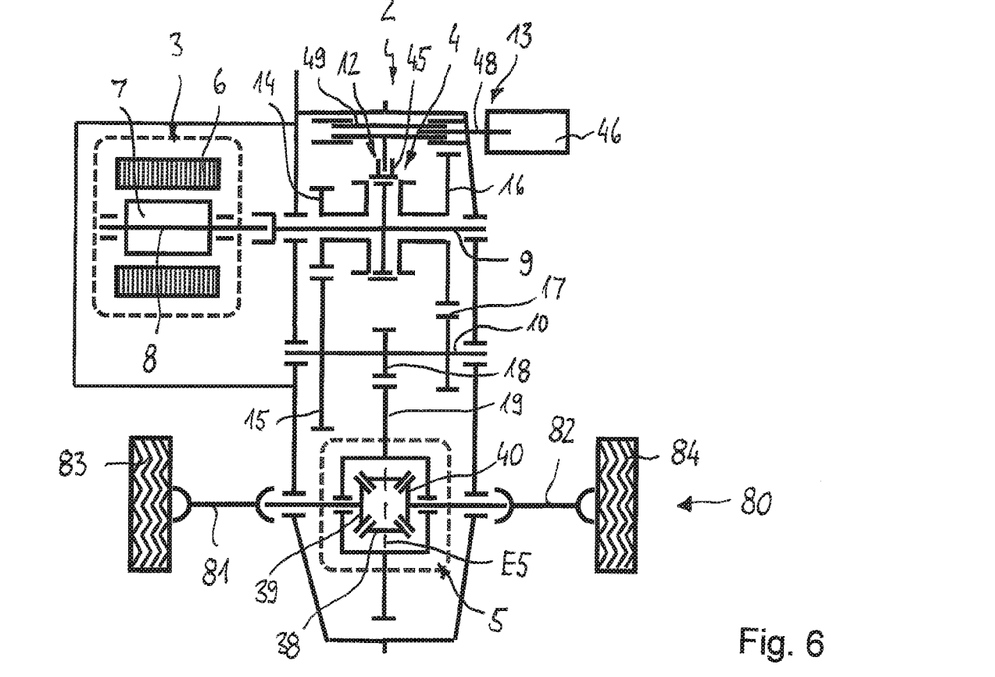
FIG. 6 is a diagrammatic illustration of an example drive assembly with an electric motor.

FIGS. 1 to 9 will be described jointly below. FIG. 1 shows an inventive drive assembly 2 with a multi-step transmission 4 and a differential drive 5. For driving the assembly including the multi-step transmission 4 and the differential drive 5, which assembly can also be referred to as transmission unit, an electric motor 3 is used which is shown in FIG. 6. The electric motor 3, the multi-step transmission 4 and the differential drive 5 jointly form an electric drive for driving a driving axle of a motor vehicle. The electric drive can be used as the only driving source or as an additional driving source.

The electric motor 3 comprises a stator 6 and a rotor 7 which is rotatable relative to the stator 6 and which, when the electric motor is supplied with current, rotatingly drives the motor shaft 8. The rotational movement of the motor shaft 8 is transmitted to the driveshaft 9 of the multi-step transmission 4. The electric motor 3 is supplied with electric current by a battery, wherein, in a generator mode, the battery can also be charged by the electric motor.

The multi-step transmission 4 comprises two transmission stages, so that the introduced torque can be transmitted from the driveshaft 9 to the intermediate shaft 10 with two different transmission ratios i1, i2. The intermediate shaft 10 is drivingly connected to the differential carrier 11 of the differential drive 5. By means of the differential drive 5, the introduced torque is divided between the sideshafts 81, 82, via which the torque is transmitted to the vehicle wheels 83, 84. There is provided a shift unit 12 which can be actuated by an actuator 13 for selectively switching the multi-step transmission 4 into the neutral position, the first gear, or the second gear. The design and mode of operation of the shift unit 12 will be described in greater detail below.

The multi-step transmission 4 is provided in the form of a reduction gearing, so that a rotational movement introduced by the electric motor 3 is reduced from a fast speed to a slow speed. The first reduction stage comprises a drive gear 14 rotatably supported on the driveshaft 9 and an intermediate gear 15 connected to the intermediate shaft 10 in a rotationally fixed way, with the drive gear 14 and the intermediate gear 15 engaging one another. The first drive gear 14 and the first intermediate gear 15 form a first set of gears with a first reduction ratio i1 which can be between 3.0' and 4.0'. The second reduction stage comprises a second drive gear 16 rotatably supported on the driveshaft 9 and a second intermediate gear 17 connected to the intermediate shaft 10 in a rotationally fixed way, which second drive gear 16 and second intermediate gear 17 engage one another. The second drive gear 16 and the second intermediate gear 17 form a second gear set with a second transmission ratio i2 which preferably lies between 1.3' and 2.3'. A third reduction stage comprises an output gear 18 rotationally fixed to the intermediate shaft 10 and the annular gear 19 firmly connected to the differential carrier 11. The output gear 18 of the intermediate shaft 11 and the annular gear 19 form a third set of gears with a third transmission ratio i3 which preferably lies between 2.4' and 3.4'. The reduction of the rotational movement between the driveshaft 9 and the differential carrier 11 will be further described in connection with the description of FIGS. 6 to 9.

It can be seen that the output gear 18 of the intermediate shaft 10 is axially arranged between the first and the second intermediate gear 15, 17. The output gear 18 is produced so as to be integral with the intermediate shaft 10 and forms two lateral supporting faces against which the two intermediate gears 15, 17 are axially supported. The drive gears 14, 16 are rotatably supported via respective bearing means 20, 20' on the driveshaft 9. The intermediate gears 15, 17 are connected to the intermediate shaft 10 in a rotationally fixed manner via shaft connections 22, 23, more particularly by a press and/welded connection.

The driveshaft 9 is rotatably supported in a housing 26 of the drive assembly 2 around a first axis of rotation A9 by means of first bearings 24, 25. The annular chamber formed at the input side of the driveshaft 9 between the shaft and the housing 26 is sealed by a radial shaft sealing ring 27. The housing 26 comprises a first housing part 28 and a second housing part 29 which are connected to one another in a joining plane E26 by suitable connecting means 30 such as threaded connections.

The intermediate shaft 10 is rotatably supported in the housing 26 around a second rotational axis A10 by means of second bearings 32, 33. The bearings 32, 33 are provided in the form of rolling contact bearings which are provided at ends of the intermediate shaft 10.

The output gear 18 of the intermediate shaft 10 engages the annular gear 19 of the differential carrier 11 for introducing torque into the differential. The differential carrier 11 which is also referred to as a differential cage, is rotatably supported in the housing 26 around the axis of rotation A11 by bearings 34, 35 and sealed by radial shaft sealing rings 36, 37. Furthermore, the differential 5 comprises a plurality of differential gears 38 which are rotatably supported in the differential carrier 11 on an axis A38 extending perpendicularly relative to the rotational axis A11, as well as two sideshaft gears 39, 40 which are rotatably arranged coaxially relative to the rotational axis A11 and which engage the differential gears 38. Two opposed differential gears 38 are rotatably supported on a bolt 41 which has been inserted into bores of the differential carrier 11 and is axially fixed. The axis A38 of the differential gears 38 defines a central differential plane E5. Torque introduced by the annular gear 19 into the differential carrier 11 is transmitted via the differential gears 38 to the two sideshaft gears 39, 40 between which there prevails a balancing effect. For transmitting torque, the sideshaft gears 39, 40 are connected to the associated sideshafts 81, 82 which transmit the torque as introduced to the wheels 83, 84 of the motor vehicle, as shown in FIGS. 6 to 9. The two sideshaft gears 39, 40 each comprise an inner toothing which, for transmitting torque, can be engaged by an associated sideshaft with a corresponding outer toothing.

It can be seen that the driveshaft 9, the intermediate shaft 10, and a rotational axis A11 of the differential carrier 11 extend parallel relative to one another. The output gear 18 of the intermediate shaft 10 at least partially has an axial overlap with the central differential plane E5. Furthermore, the joining plane E26 of the housing 26 axially overlaps the output gear 18 of the intermediate shaft, and respectively the shift unit 12. Overall, the present design achieves a symmetrical construction of the transmission unit with reference to the central differential plane, respectively the joining plane. This leads to a compact design and ensures easy mounting conditions of the assembly.

Figure 2:
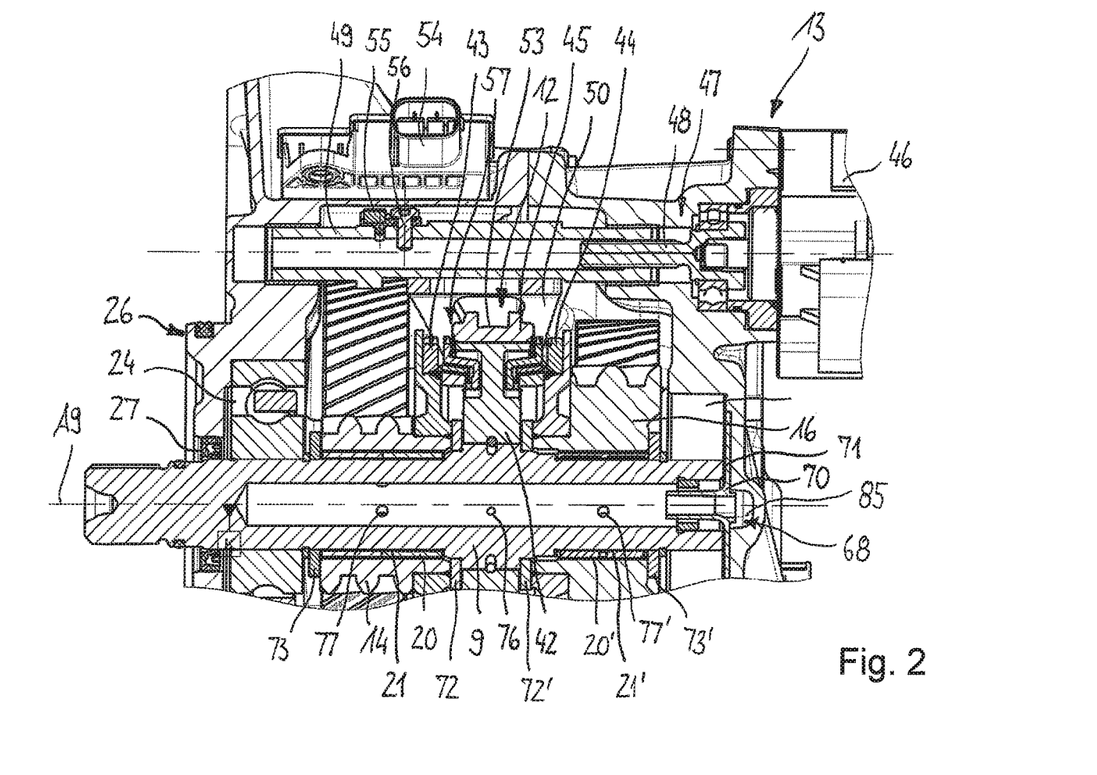
FIG. 2 shows a detail of the drive assembly according to FIG. 1.

The shift unit 12 whose details are shown in FIGS. 2 and 4 is axially arranged between the first output gear 14 and the second output gear 16. The shift unit comprises an input part 42, which is connected to the driveshaft 9 so as to be rotationally fixed and axially fixed, as well as a second output part 44 which is fixedly connected to the second drive gear 16. The input part 42 is connected with a press fit to the driveshaft in a rotationally fixed way. For the purpose of axial securing a securing ring 78 is provided which engages corresponding annular grooves in the driveshaft and of the input part respectively. A coupler 45 is provided which can connect the input part 42 optionally to the first output part 43 or the second output part 44 for transmitting torque. For this, the coupler 45 is provided in the form of a sliding sleeve which is held on the input part 44 so as to be rotationally fixed and axially displaceable.

The sliding sleeve is actuated by an actuator 13 which comprises an electromotive rotary drive 46 and convertor unit 47 which converts a rotational movement into a linear movement. The convertor unit 47 comprises a spindle drive with a rotatingly drivable spindle 48 and a spindle sleeve 49 which is moved axially when the spindle rotates. A shift fork 50 is fixed to the spindle sleeve 49, which, by means of two catch members 52 engages an annular groove 53 of the sliding sleeve 45. The actuator 13 can be controlled by an electronic control unit (not illustrated) and can be controlled by same as required depending on the driving condition of the motor vehicle. For this, the electronic control unit can receive as input values a value representing the rotational speed of the driveshaft 9 and a value representing the rotational speed of the intermediate shaft 10. For example, these could be the rotational speed of the electric motor 3 and the rotational speed of the vehicle wheels 83, 84, from which the rotational speeds of the driveshaft 9 and of the intermediate shaft 10 can be determined.

For accurately controlling and positioning the sliding sleeve 45 a sensor 54 is provided which is configured to detect a signal representing the axial position of the shift fork 50 and of the switching sleeve 45 and passing same on to the control unit. The sensor is provided in the form of a path sensor, more particularly as a contact-less sensor such as a magnet field sensor or an inductive sensor. Using a contact-less sensor is advantageous in that there is little loss of power and little wear. The contact-less sensor cooperates with a sensor target 55. The sensor 54 detects the axial position of the sensor target 55 and transmits a corresponding sensor signal to the electronic control unit. The sensor target 55 is connected to the spindle sleeve 49, so that the sensor target 55 is axially moved together with the spindle sleeve 49 when the actuator 13 is actuated. The sensor target 55 is received in a carrier element which is fixed to the spindle sleeve by means of a screwed connection 56. To achieve particularly accurate control conditions, further detecting means can be provided in addition to said path sensor 54. More particularly, said means detect a signal representing the force needed for axially moving the sliding sleeve 45 and the spindle sleeve 49 respectively, which is the reason why they can also be referred to as force sensor. For example, a current signal for controlling the actuator can be detected, which signal is representative of the force required to drive the spindle.

Furthermore, the gear shift unit 12 comprises a synchronising mechanism 57, 57' for an output part 43, 44 by which, prior to the switching operation, the speeds of the components to be connected are equalised, i.e., between the input part 42 and the respective output part 43, 44. As the synchronising mechanisms 57, 57' have the same structure, only one is described as representative for the other one, too. The synchronising mechanism 57 comprises an outer ring 58 with an inner cone, an inner ring 59 with an outer cone, and an intermediate ring 60 arranged therebetween. The outer ring 58 is rotationally fixed to the inner ring 42 such that both jointly rotate around the rotational axis A9, with a limited relative movement between the input part 42 and the outer ring 58 being possible. The intermediate ring 60 is rotationally fixed to the output part 43. The inner ring 59, again, is connected to the input part 42 in a rotationally fixed manner. This design ensures that engagement between the sliding sleeve 45 and the respective output part 43, 44 can only take place if both rotate at the same speed, i.e., that they are synchronised. Synchronisation is achieved by a plurality of circumferentially distributed pressure pieces 62 which are rotationally fixed to the input part 42 such that they rotate jointly with same. By axially moving sliding sleeve 45, the pressure pieces 62 are loaded against the outer ring 58, so that friction locking occurs at the surface pairs between the outer race 58 and the intermediate ring 60 on the one side, and between the intermediate ring 60 and the inner ring 59 on the other side. Such friction locking leads to the speeds between the input part 42 and the respective output part 43, 44 being equalised. If the parts to be connected rotate synchronously, the sliding sleeve 45 can be moved fully into the engaging position, so that the input part 42 and the respective output part 43, 44 are connected to one another for the transmitting torque. The pressure pieces 62 are each connected to the sliding sleeve 45 via a ball 63 which is tensioned radially outwardly by a spring 64. Thereby, the ball 63 form-lockingly engages the inner groove 65 of the sliding sleeve 45. If the axial actuating force of the sliding sleeve 45 exceeds the holding force of the ball 63, the ball 63 is moved radially inwardly against the pretensioning force of the spring 64, so that the sliding sleeve can continue to be moved towards the respective output parts 43, 44.

In order to achieve a good supply of lubricant and a long service life of the rotating parts, the driveshaft 9 comprises a longitudinal bore 75 as well as several circumferentially distributed transverse bores 76, 77, 77' for a seat face for the gears 42, 14, 16 arranged thereon. In this way lubricant can flow from the inside of the driveshaft 9 to the seat portion 31 of the input part 42 and, respectively, to the seat portions 21, 21' of the first and second drive gear 14, 16 for lubricating same. The seat portions 21, 21' of the first and of the second drive gear 14, 16 are fluidically connected to the shift unit 12, so that lubricant can flow from the respective seat portion subsequently to the shift unit 12 to lubricate same.

Figure 3:
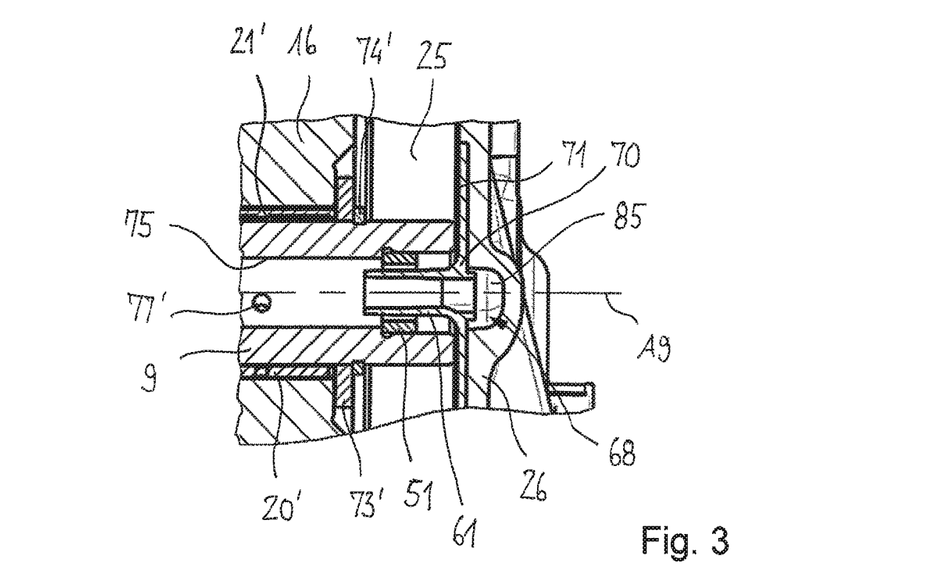
FIG. 3 shows the supply assembly according to FIG. 1 and FIG. 2 in detail.

At the end of the driveshaft 9, a supply assembly 68 is provided for supplying lubricant into the longitudinal bore 75. The housing 26 comprises a catching rib (not illustrated) which catches any lubricant centrifuged in the transmission, which lubricant can flow into a chamber 85 via a channel. The supply assembly 68 comprises a ring 51 which is positioned in the longitudinal bore 75, as well as a supplying element 70 with a tubular channel 61 which extends from the chamber 85 through the ring 51 into the longitudinal bore 75. Thus, any lubricant contained in the chamber 85 can flow through the channel 61 into the longitudinal bore 75. The ring 51 is pressed into the longitudinal bore 75 with interference and is axially supported against a shoulder of the driveshaft 9. The ring 51 has a smaller inner diameter than the longitudinal bore 75 so that it forms a barrier for any lubricant having entered the longitudinal bore 75. The ring 51 prevents the lubricant from returning from the bore, which lubricant due to the centrifugal forces, spreads annularly as a film at the inner wall forming the bore. In this way, lubricant reaches the transverse bores 76, 77, 77' in a targeted manner and from there it flows to the bearing seats of the drive gears 14, 16 and to the seat face of the input part 42 respectively. Between the tube 61 and the ring 51 an annular gap is formed through which excessive lubricant can flow out of the longitudinal bore 75 and through radial gaps 71 in a flange portion of the supply element 70 towards the bearing 25 for lubricating same.

The first output part 43 is firmly connected to a first ring 66, e.g., welded thereto. For this, the first ring 66 comprises an annular recess in which the output part 43 is positioned. Radially inside, the first ring 66 comprises a hub portion which is positioned on a sleeve projection 67 of the first drive gear 14 and is firmly connected to same. For fixing, a weld 69 is provided which, from the end face, is produced in the axial direction. The first output part 43, the first ring 66, and the first drive gear 14 jointly form a first gearwheel. The first gearwheel is rotatably supported on the driveshaft 9 by means of a bearing 20. The bearing 20 is provided in the form of a slide bearing and comprises two bearing bushes, with other suitable bearing means also being possible. In the axial direction, the first gearwheel is fixed between a first inner disc 72 and a first outer disc 73, with the expressions "inner disc" and "outer disc" referring to a central plane of the shift unit. The inner disc 72 is positioned on a corresponding seat face of the driveshaft 9, e.g., with interference fit, and is axially supported against a shoulder of the driveshaft. The outer disc 73 is axially supported against the driveshaft 9 in the opposed axial direction via a securing ring 74. The discs 72, 73 are provided in the form of sliding discs from a low-friction material. It can be seen in particular in FIGS. 4 and 5 that the first inner disc 72 comprises a plurality of circumferentially distributed grooves 79 through which lubricant can flow from the bearing 20 through an annular gap 86 formed between the drive gear 14 and the driveshaft 9 to the first synchronising mechanism 57 of the shift unit 12. In contrast thereto, the outer disc 73 comprises a continuous, groove-less contact face against which the drive gear 14 is axially supported. By this design with lubricating grooves 79 in the inner disc 72 and a groove-less outer disc 73, the lubricant flowing through the transverse bores 77 of the driveshaft to the bearing seat of the drive gear 14 is directed to the shift unit and the synchronising mechanism respectively.

The second output part 44, the second ring 66' and the second drive gear 16, accordingly, form a second gear-wheel which is designed analogously to the first gear-wheel. To that extent, regarding the joint features, reference is made to the description of the first gear-wheel, with corresponding details having been given the same reference numbers with indices. The mode of operation and the structure of the details referring to the lubrication of the second gear 16 and, respectively of the second synchronising mechanism 57' are identical to those of the first drive gear 14 and, respectively to those of the first synchronising mechanism 57 so that, for the sake of brevity reference is again made to the above description.

Below, with special reference to FIGS. 6 to 9, the gear shifting of the drive assembly 2 is explained. FIG. 6 shows diagrammatically the drive assembly 2 with the electric motor 3 for driving the motor vehicle axle 80. One can see the sideshafts 81, 82 and the wheels 83, 84 of the vehicle axle 80, with the wheels 83, 84 being connected to the sideshafts 82, 83.

As explained above, the drive assembly 2 comprise a two-stage transmission which is formed by a first power path and a functionally parallel second power path. By controlling the shift unit 12 accordingly, torque can be transmitted selectively via the first power path or, alternatively, via the second power path, from the electric motor 3 to the differential 5 and, respectively, to the driving axle 80.

Figure 7:
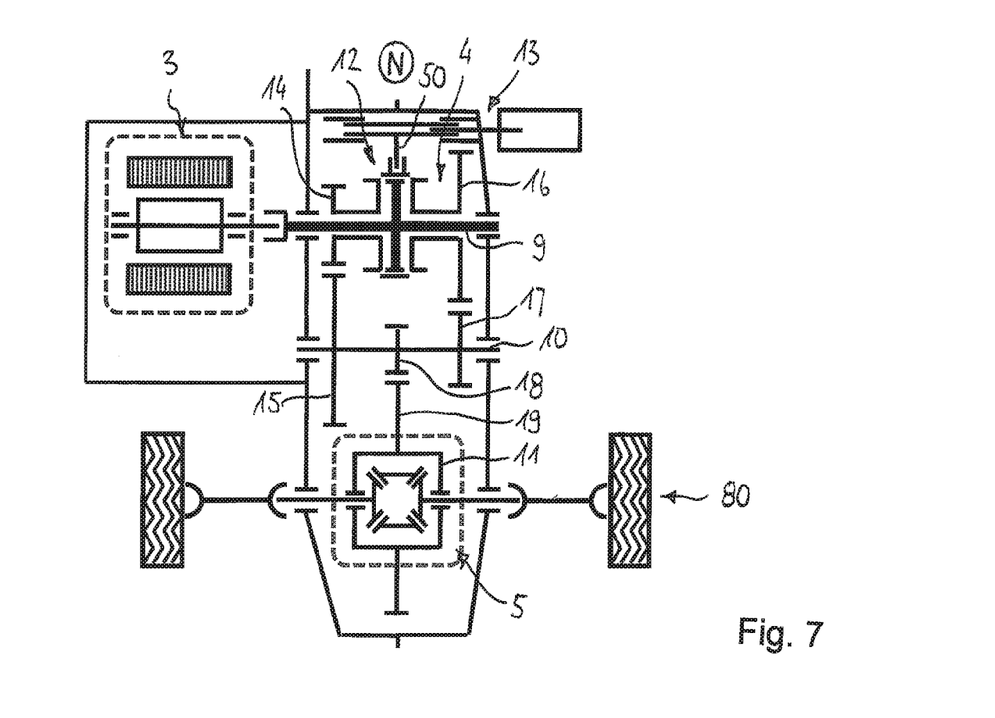
FIG. 7 shows the drive assembly according to FIG. 6 in a neutral position (N)

FIG. 7 shows the shift unit 12 in the neutral position (N) which can also be referred to as the idling position. The components drivingly connected to the electric motor 3 are shown in bold lines. It can be seen that the switching sleeve 45, when in the neutral position, is in a central position. In this position, the electric motor 3 and the differential 5 are uncoupled from one another, so that no torque can be transmitted between the sideshafts 81, 82 and the electric motor 3. This is necessary, for example, if the motor vehicle has to be towed away because of an accident.

Figure 8:
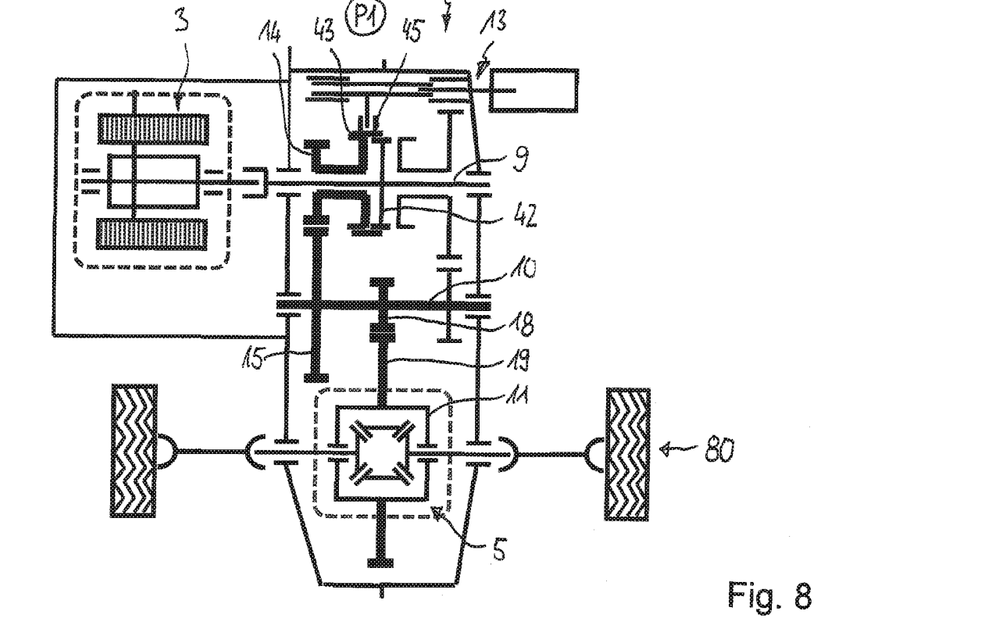
FIG. 8 shows the drive assembly according to FIG. 7 in a first shift position (P1)

In the first switched position (P1), which is shown in FIG. 8, the sliding sleeve 45 is connected to the first output part 43, and/or to the first drive gear 14, in a rotationally fixed way. Torque is transmitted from the electric motor 3 to the differential 5 via the first power path which is drawn in bold lines. The first power path comprises the driveshaft 9 driven by the electric motor 3, the input part 42, the first drive gear 14, the first intermediate gear 15, the intermediate shaft 10 and the output gear 18 which engages the annular gear 19 for driving the differential 5.

Figure 9:
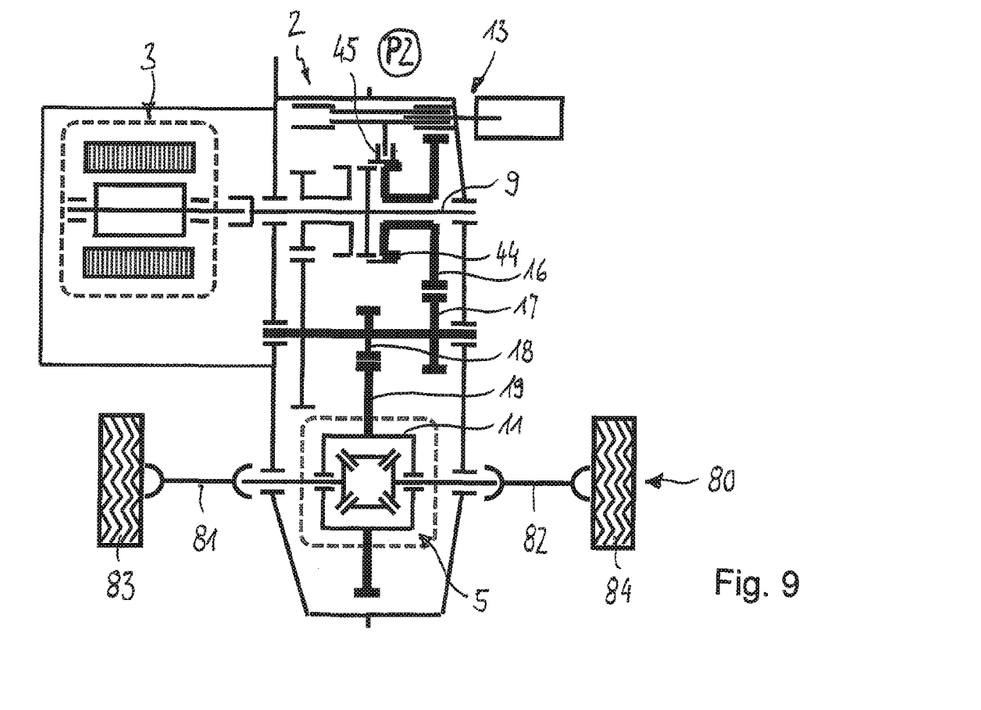
FIG. 9 shows the drive assembly according to FIG. 8 in a second shift position (P2).

In the second switching position (P2), which is shown in FIG. 9, the sliding sleeve 45 is coupled to the second output part 44, and/or to the second drive gear 16, so that torque is transmitted via the second power path, which again is shown in bold lines. The second power path comprises the driveshaft 9, the input part 42, the second drive gear 16, the intermediate gear 17, the intermediate shaft 10 and the output gear 18 which engages the annular gear 19.

Overall, the drive assembly 2 comprises three pairs of gears: the first drive gear 14 and the intermediate gear 15 (first pair of gears); the second drive gear 16 and the intermediate gear 17 (second pair of gears); and the output gear 18 and the annular gear 19 (third pair of gears). Depending on the switching position of the shift unit 12, drive is effected via the first or the second pair of gears, so that there are thus obtained two gear-stages.

The first and the second power path are functionally arranged in parallel and have different transmission ratios, i.e., the transmission of torque takes place in the first power path with a first transmission ratio (first gear stage), or via the second power path with the second transmission ratio (second gear stage). The transmission ratio of the first power path is influenced by the pair of gears between the first drive gear 14 and the second intermediate gear 15, with the number of teeth of the first drive gear 14 being smaller than those of the first intermediate gear 15. The transmission ratio of the second power path is influenced by the pair of gears between the second drive gear 16 and the second intermediate gear 17 which comprises a larger number of teeth than the second drive gear 16. Furthermore, it can be seen that the first drive gear 14 comprises a smaller number of teeth than the second drive gear 16 and that the first intermediate gear 15 comprises a larger number of teeth than the second intermediate gear 17. As a result, the first transmission ratio ($i1=z15/z14$) of the first pair of gears (15, 14) is greater than the second transmission ratio ($i2=z17/z16$) of the second pair of gears (17, 16). As a result, in the case that torque is transmitted via the first power path (first gear) the annular gear 19 rotates slower than in the case of a torque transmission via the second power path (second gear).

A special feature of the, drive assembly 2 is that the shift unit 12 has a substantial axial overlap with the output gear 18 of the intermediate shaft. The overlap is largely at least, i.e., the axially overlapping portion between the shift unit 12 and the drive gear 18 is bigger than the non-overlapping portion. A radially outer part of the switch unit 12 covers the first intermediate gear 15 and the second intermediate gear 17 in a radial direction. Furthermore, the annular gear 19 of the differential 5 and, respectively, the central differential plane E5 are also arranged in the region of axial overlap with the shift unit 12. A further special feature is that the first and the second drive gears 14, 16 of the transmission stages are arranged coaxially relative to the driveshaft 9 driven by the electric motor 3. Overall, this design ensures excellent utilisation of the available space and a very compact size of the drive assembly 2.

The invention claimed is:
1. A drive assembly for a motor vehicle, having a multi-step transmission and a differential drive,
wherein the multi-step transmission comprises a rotatingly drivable driveshaft, an intermediate driveshaft arranged parallel to the rotatingly drivable driveshaft, at least a first transmission stage and a second trans- mission stage for transmitting torque from the rotatingly drivable driveshaft to the intermediate driveshaft with different transmission ratios, as well as a shift unit which is arranged coaxially relative to the rotatingly drivable driveshaft;

wherein the first transmission stage comprises a first drive gear rotatably supported on the rotatingly drivable driveshaft and a first intermediate gear connected to the intermediate driveshaft in a rotationally fixed manner, and wherein the second transmission stage comprises a second drive gear rotatably supported on the rotatingly drivable driveshaft, and a second intermediate gear connected to the intermediate driveshaft in a rotationally fixed manner;

wherein the shift unit comprises an input part which is connected to the rotatingly drivable driveshaft in a rotationally fixed manner at a seat portion of the input part, a first output part which is connected to the first drive gear in a rotationally fixed manner, a second output part which is connected to the second drive gear in a rotationally fixed manner, and a coupler by which the input part can optionally be coupled to the first output part or to the second output part for transmitting torque;

wherein the intermediate driveshaft comprises an output gear for transmitting torque to a differential carrier of the differential drive, wherein a rotational axis of the differential carrier extends parallel to the intermediate driveshaft;

wherein the output gear and the shift unit are arranged axially between the at least two transmission stages;

wherein the rotatingly drivable driveshaft comprises a longitudinal bore and a first transverse bore for supplying lubricant to a seat portion of the first drive gear, a second transverse bore for supplying lubricant to a seat portion of the second drive gear and a central transverse bore in alignment with the seat portion of the input part for supplying lubricant thereto; and wherein the seat portion of the input part is connected to the rotatingly drivable driveshaft in a rotationally fixed manner with an interference fit, wherein the central transverse bore is fluidically connected with the seat portion of the input part that is connected to the rotatingly drivable driveshaft with the interference fit.

2. The drive assembly of claim 1, wherein the seat portion of at least one of the first drive gear and the second drive gear is fluidically connected to the shift unit such that lubricant can flow from the seat portion to the shift unit.

3. The drive assembly of claim 1, wherein the first transverse bore is fluidically connected to the seat portion of the first drive gear and the second transverse bore is fluidically connected to the seat portion of the second drive gear.

4. The drive assembly of claim 1,
wherein the first drive gear is rotationally supported on the rotatingly drivable driveshaft by a first bearing, wherein the first drive gear comprises a first sleeve projection which axially extends towards the input part, wherein a first annular gap is provided laterally adjoining the first bearing, between the first sleeve projection and the rotatingly drivable driveshaft, through which first annular gap lubricant can flow from the seat portion of the first drive gear to the shift unit, and
the second drive gear is rotationally supported on the rotatingly drivable driveshaft by a second bearing, wherein the second drive gear comprises a second sleeve projection which axially extends towards the input part, wherein a second annular gap is provided laterally adjoining the second bearing, between the second sleeve projection and the rotatingly drivable driveshaft, through which second annular gap lubricant can flow from the seat portion of the second drive gear to the shift unit.

5. The drive assembly of claim 1,
wherein the first drive gear is axially supported towards the input part against a first inner disc and away from the input part against a first outer disc, wherein the first inner disc comprises at least one groove through which lubricant can flow from the seat portion of the first drive gear to the shift unit, and
the second drive gear is axially supported towards the input part against a second inner disc and away from the input part against a second outer disc, wherein the second inner disc comprises at least one groove through which lubricant can flow from the seat portion of the second drive gear to the shift unit.

6. The drive assembly of claim 1,
wherein at one end of the rotatingly drivable driveshaft, a supplying assembly is provided for supplying lubricant into the longitudinal bore; and
wherein the supplying assembly comprises a supplying element with a tubular channel which extends into the longitudinal bore, as well as a ring attached in the longitudinal bore which prevents lubricant from returning out of the longitudinal bore.

7. The drive assembly of claim 1,
wherein exactly one electric motor with a motor shaft is provided for driving the rotatingly drivable driveshaft and
wherein the rotatingly drivable driveshaft is arranged coaxially relative to the motor shaft of the electric motor and wherein a transmission ratio between the motor shaft and the rotatingly drivable driveshaft is one.

8. The drive assembly of claim 1,
wherein at least one of the following applies with regard to a transmission from the rotatingly drivable driveshaft to the intermediate driveshaft:
the first transmission ratio between the first drive gear and the first intermediate gear is between 3.0 and 4.0; and
the second transmission ratio between the second drive gear and the second intermediate gear is between 1.3 to 2.3.

9. The drive assembly of claim 1, wherein the shift unit partially radially overlaps the first intermediate gear and the second intermediate gear.

10. The drive assembly of claim 1, wherein at least one of the following applies:
the shift unit has at least partially an axial overlap with a central differential plane of the differential drive, and the central differential plane extends perpendicularly to the differential axis and contains a differential gear axis.

11. The drive assembly of claim 1,
wherein the coupler is provided in the form of a sliding sleeve, which is held on the input part in a rotationally fixed manner and is axially movable relative to same by means of an actuator and
wherein the sliding sleeve is in a neutral position freely rotatable relative to the first and to the second output part, is in a first transmission position connected to the first output part in a rotationally fixed manner, and is in a second transmission position connected to the second output part in a rotationally fixed manner.

12. The drive assembly of claim 11,
wherein the actuator comprises a spindle drive, with a rotationally drivable spindle and a spindle sleeve which engages a corresponding outer thread of the spindle with an inner thread so that the spindle sleeve is axially moved when the spindle rotates, wherein a switch fork is fixed at the spindle sleeve, which switch fork engages an annular groove of the sliding sleeve.

13. The drive assembly of claim 12,
wherein a sensor is provided which is configured to detect a signal representing the position of the spindle sleeve, which signal can be transmitted to an electronic control unit for controlling the spindle drive.

14. The drive assembly of claim 12,
wherein there are provided detecting means which are configured to detect a signal representing the force for axially moving the spindle sleeve, which signal is transmitted to the control unit for controlling the spindle drive.

15. The drive assembly of claim 1,
wherein the output gear is integrally formed with the intermediate driveshaft, wherein the first intermediate gear is axially supported against a first side face of the output gear and the second intermediate gear is axially supported against a second side face of the output gear facing in an opposite direction, wherein the output gear comprises a smaller diameter and a greater width than the first intermediate gear and the second intermediate gear.

16. The drive assembly of claim 1,
wherein the central transverse bore connects with a securing ring disposed between the seat portion of the input part and the rotatingly drivable driveshaft.

17. drive assembly for a motor vehicle, having a multi-step transmission and a differential drive,
wherein the multi-step transmission comprises a rotatingly drivable driveshaft, an intermediate driveshaft arranged parallel to the rotatingly drivable driveshaft, at least a first transmission stage and a second transmission stage for transmitting torque from the rotatingly drivable driveshaft to the intermediate driveshaft with different transmission ratios, as well as a shift unit which is arranged coaxially relative to the rotatingly drivable driveshaft;
wherein the first transmission stage comprises a first drive gear rotatably supported on the rotatingly drivable driveshaft and a first intermediate gear connected to the intermediate driveshaft in a rotationally fixed manner, and wherein the second transmission stage comprises a second drive gear rotatably supported on the rotatingly drivable driveshaft, and a second intermediate gear connected to the intermediate driveshaft in a rotationally fixed manner;
wherein the shift unit comprises an input part which is connected to the rotatingly drivable driveshaft in a rotationally fixed manner, a first output part which is connected to the first drive gear in a rotationally fixed manner, a second output part which is connected to the second drive gear in a rotationally fixed manner, and a coupler by which the input part can optionally be coupled to the first output part or to the second output part for transmitting torque;
wherein the intermediate driveshaft comprises an output gear for transmitting torque to a differential carrier of the differential drive, wherein a rotational axis of the differential carrier extends parallel to the intermediate driveshaft;
wherein the output gear and the shift unit are arranged axially between the at least two transmission stages;
wherein the rotatingly drivable driveshaft comprises a longitudinal bore and a transverse bore for supplying lubricant to a seat portion of the input part;
wherein the seat portion of the input part is connected to the rotatingly drivable driveshaft in a rotationally fixed manner with an interference fit, wherein the transverse bore is fluidically connected with the seat portion of the input part;
wherein the first drive gear is rotationally supported on the rotatingly drivable driveshaft by a first bearing, wherein the first drive gear comprises a first sleeve projection which axially extends towards the input part, wherein a first annular gap is provided laterally adjoining the first bearing, between the first sleeve projection and the rotatingly drivable driveshaft, through which first annular gap lubricant can flow from the seat portion of the first drive gear to the shift unit; and
wherein the second drive gear is rotationally supported on the rotatingly drivable driveshaft by a second bearing, wherein the second drive gear comprises a second sleeve projection which axially extends towards the input part, wherein a second annular gap is provided laterally adjoining the second bearing, between the second sleeve projection and the rotatingly drivable driveshaft, through which second annular gap lubricant can flow from the seat portion of the second drive gear to the shift unit.

18. A drive assembly for a motor vehicle, having a multi-step transmission and a differential drive,
wherein the multi-step transmission comprises a rotatingly drivable driveshaft, an intermediate driveshaft arranged parallel to the rotatingly drivable driveshaft, at least a first transmission stage and a second transmission stage for transmitting torque from the rotatingly drivable driveshaft to the intermediate driveshaft with different transmission ratios, as well as a shift unit which is arranged coaxially relative to the rotatingly drivable driveshaft;
wherein the first transmission stage comprises a first drive gear rotatably supported on the rotatingly drivable driveshaft and a first intermediate gear connected to the intermediate driveshaft in a rotationally fixed manner, and wherein the second transmission stage comprises a second drive gear rotatably supported on the rotatingly drivable driveshaft, and a second intermediate gear connected to the intermediate driveshaft in a rotationally fixed manner;
wherein the shift unit comprises an input part which is connected to the rotatingly drivable driveshaft in a rotationally fixed manner, a first output part which is connected to the first drive gear in a rotationally fixed manner, a second output part which is connected to the second drive gear in a rotationally fixed manner, and a coupler by which the input part can optionally be coupled to the first output part or to the second output part for transmitting torque;
wherein the intermediate driveshaft comprises an output gear for transmitting torque to a differential carrier of the differential drive, wherein a rotational axis of the differential carrier extends parallel to the intermediate driveshaft;
wherein the output gear and the shift unit are arranged axially between the at least two transmission stages;

wherein the rotatingly drivable driveshaft comprises a longitudinal bore and a transverse bore for supplying lubricant to a seat portion of the input part;

wherein the seat portion of the input part is connected to the rotatingly drivable driveshaft in a rotationally fixed manner with an interference fit, wherein the transverse bore is fluidically connected with the seat portion of the input part;

wherein the coupler is provided in the form of a sliding sleeve, which is held on the input part in a rotationally fixed manner and is axially movable relative to same by means of an actuator; and wherein the sliding sleeve is in a neutral position freely rotatable relative to the first and to the second output part, is in a first transmission position connected to the first output part in a rotationally fixed manner, and is in a second transmission position connected to the second output part in a rotationally fixed manner.

* * * * *

UNITED STATES PATENT AND TRADEMARK OFFICE
CERTIFICATE OF CORRECTION

PATENT NO.      : 9,951,850 B2
APPLICATION NO. : 15/301458
DATED           : April 24, 2018
INVENTOR(S)     : Fred Kramer et al.

Page 1 of 1

It is certified that error appears in the above-identified patent and that said Letters Patent is hereby corrected as shown below:

In the Claims

Column 15, in Line 34, replace "drive assembly" with -- A drive assembly --.

Signed and Sealed this
Fifth Day of June, 2018

Andrei Iancu
*Director of the United States Patent and Trademark Office*